(12) United States Patent
Naito et al.

(10) Patent No.: US 10,538,674 B2
(45) Date of Patent: Jan. 21, 2020

(54) METHOD OF FORMING ANTI-RUST OR ANTI-BACTERIAL FILM CONTAINING TANNIC ACID DERIVATIVES

(71) Applicant: NATIONAL INSTITUTE FOR MATERIALS SCIENCE, Tsukuba-shi, Ibaraki (JP)

(72) Inventors: Masanobu Naito, Tsukuba (JP); Debabrata Payra, Tsukuba (JP)

(73) Assignee: NATIONAL INSTITUTE FOR MATERIALS SCIENCE, Tsukuba-shi, Ibaraki (JP)

( * ) Notice: Subject to any disclaimer, the term of this patent is extended or adjusted under 35 U.S.C. 154(b) by 0 days.

(21) Appl. No.: 15/971,539

(22) Filed: May 4, 2018

(65) Prior Publication Data
US 2018/0258291 A1 Sep. 13, 2018

Related U.S. Application Data

(63) Continuation of application No. 15/526,208, filed as application No. PCT/JP2015/081600 on Nov. 10, 2015.

(30) Foreign Application Priority Data

Nov. 11, 2014 (JP) .................. 2014-228667

(51) Int. Cl.
*C09D 199/00* (2006.01)
*C09D 5/00* (2006.01)
(Continued)

(52) U.S. Cl.
CPC .............. *C09D 5/00* (2013.01); *B05D 7/24* (2013.01); *C09D 5/08* (2013.01); *C09D 5/086* (2013.01);
(Continued)

(58) Field of Classification Search
None
See application file for complete search history.

(56) References Cited

U.S. PATENT DOCUMENTS 4,177,174 A * 12/1979 Hayashi ............... C08G 59/625
525/450
4,880,478 A * 11/1989 Emeric .................. C23C 22/13
148/248
(Continued)

FOREIGN PATENT DOCUMENTS

JP 2004-307362 * 11/2004

OTHER PUBLICATIONS

Tannins and Extracts of Fruit Byproducts: Antibacterial Activity Against Foodborne Bacteria and Antioxidant Capacity. Cristina Cruz et al.. Journal of Agriculural and Food Chemistry. (Year: 2014).*

(Continued)

*Primary Examiner* — Melvin C. Mayes
*Assistant Examiner* — Colette B Nguyen
(74) *Attorney, Agent, or Firm* — Manabu Kanesaka

(57) ABSTRACT

A method of forming anti-rust or anti-bacterial film includes mixing a predetermined liquid and a film-forming composition which contains a tannic acid derivative in which hydrogen atoms in at least 10% of hydroxyl groups of tannic acid are substituted by a chain hydrocarbon group having 10 to 16 carbon atoms, and removing the liquid.

15 Claims, 17 Drawing Sheets

(51) Int. Cl.
*C09D 5/14* (2006.01)
*C23F 11/00* (2006.01)
*C09D 5/08* (2006.01)
*B05D 7/24* (2006.01)

(52) U.S. Cl.
CPC .............. *C09D 5/14* (2013.01); *C09D 199/00* (2013.01); *C23F 11/00* (2013.01)

(56) References Cited

U.S. PATENT DOCUMENTS

| | | | | |
|---|---|---|---|---|
| 5,096,741 | A * | 3/1992 | Kobayashi | C09D 5/086 427/127 |
| 2012/0245267 | A1 * | 9/2012 | Blanchard | C09D 7/63 524/218 |
| 2013/0161062 | A1 * | 6/2013 | Yamaoka | C09D 5/084 174/110 SR |
| 2015/0272834 | A1 * | 10/2015 | Sun | A61K 8/022 424/401 |

OTHER PUBLICATIONS

Incorporation of tannic acid in formulations for topical use in wound healing: a technological prospecting. Antonia de Sousa Leal et al. African Journal of Pharmacy and Pharmacology. Jun. 2015.*
JP2004-307362 Translation (Nov. 2004).*
Incorporation of tannic acid in formulations for topical use in wound healing: a technological prospecting. Antonia de Sousa Leal et al. African Journal of Pharmacy and Pharmacology. Jun. 2015 (Year: 2015).*
JP2004-307362 Translation (Nov. 2004) (Year: 2004).*

* cited by examiner

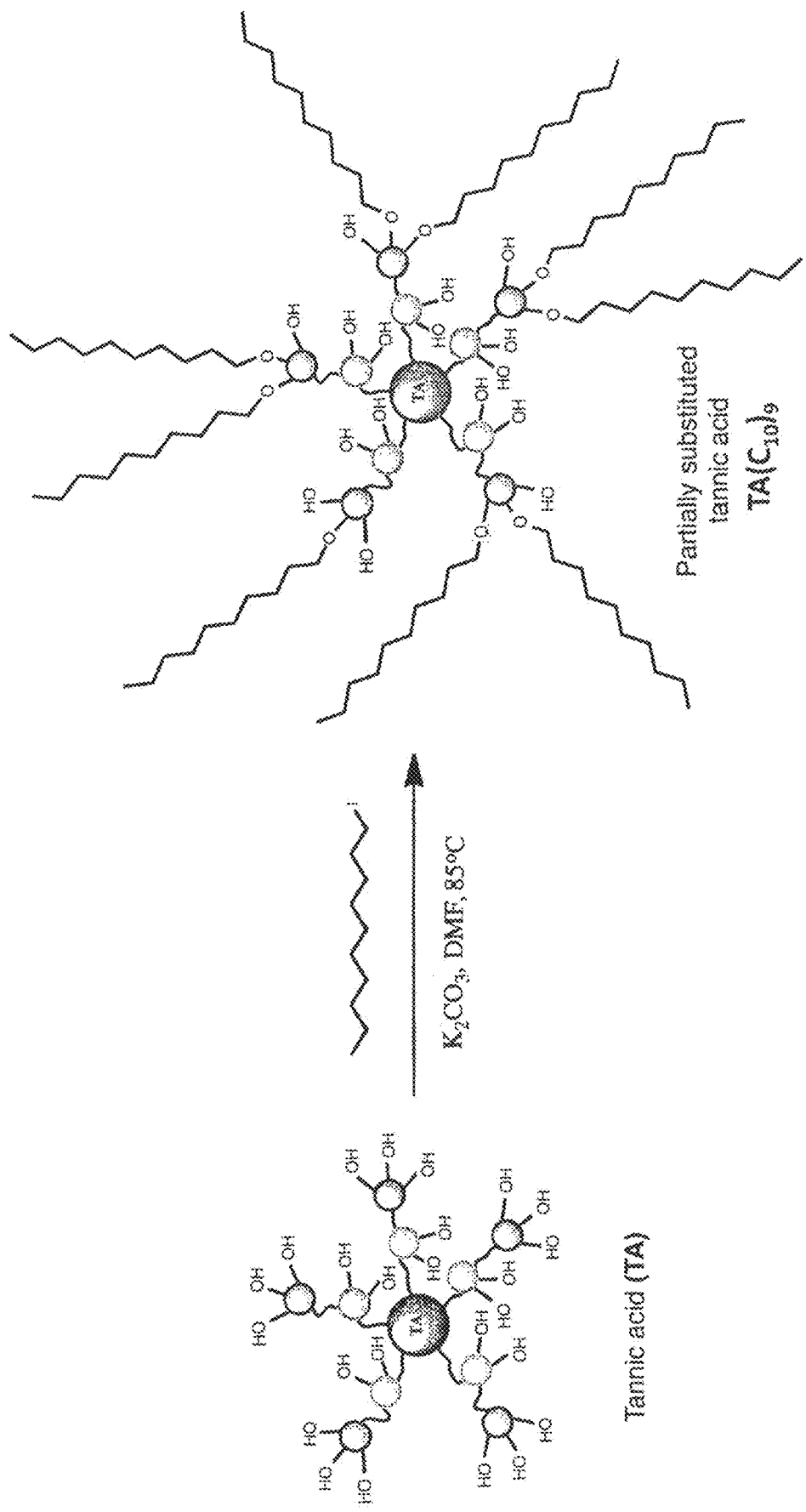

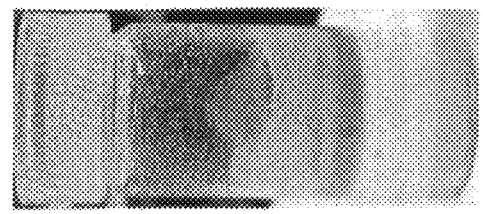
FIG. 2(c) in CHCl₃
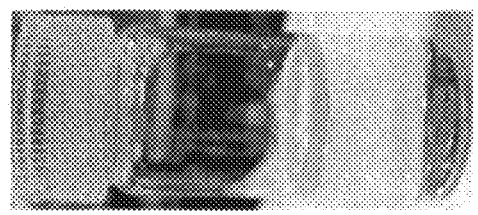
FIG. 2(b) in H₂O
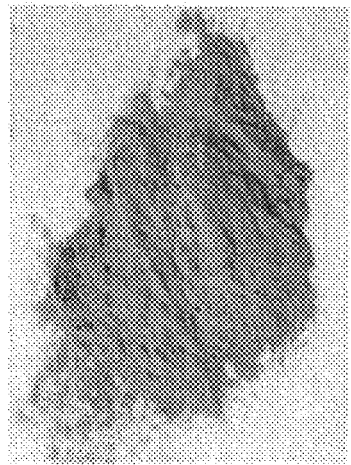
FIG. 2(a)
Tannic acid:
A naturally abundant "Polyphenol" in woods FIG.3
FIG.4(a)　　　FIG.4(b)　　FIG.4(c)
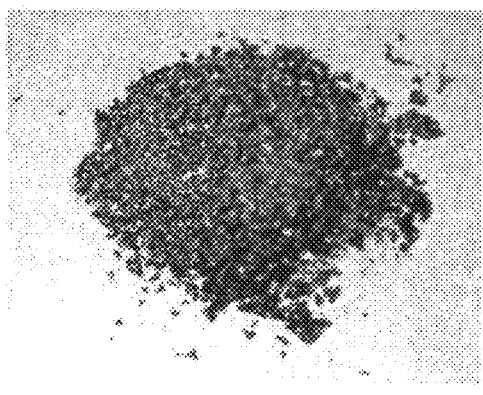 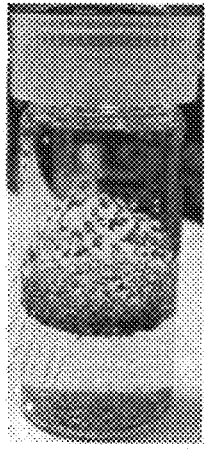 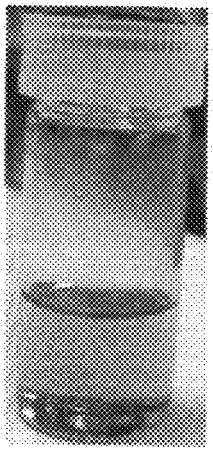
in H₂O　　　in CHCl₃

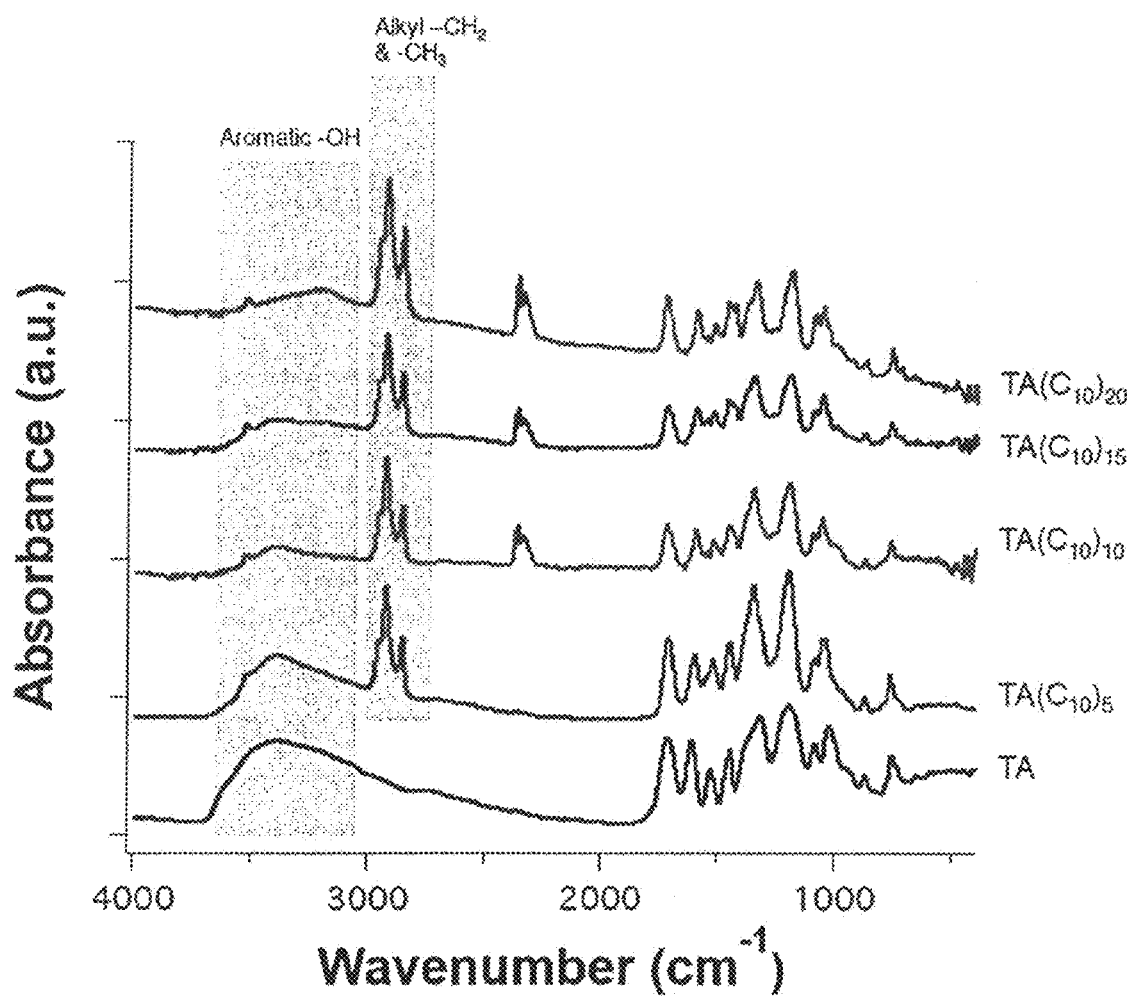

Mg alloy (AZ 31)

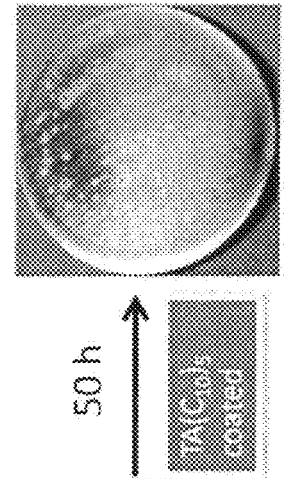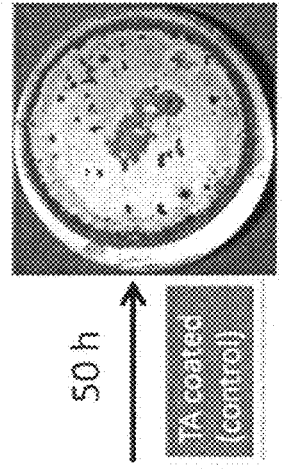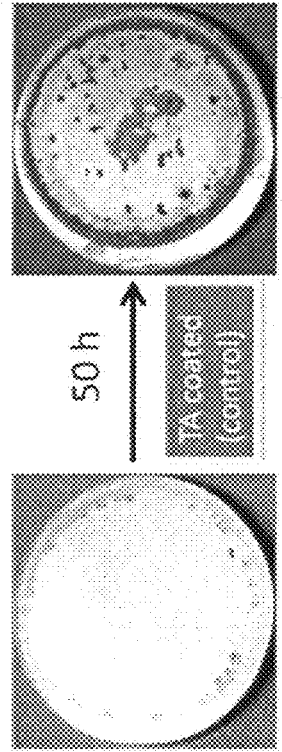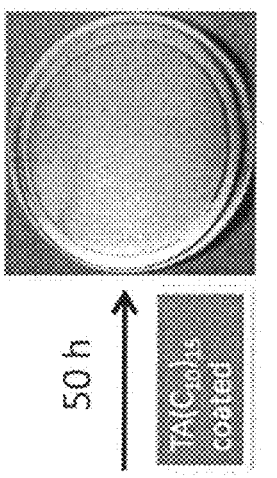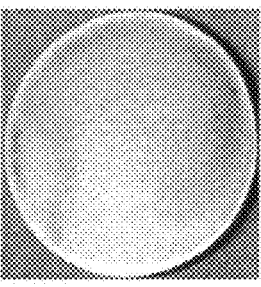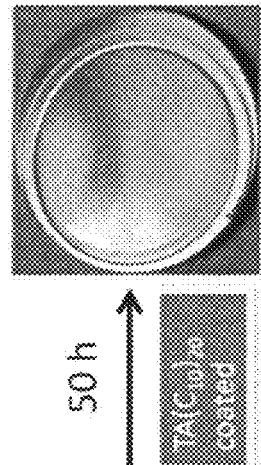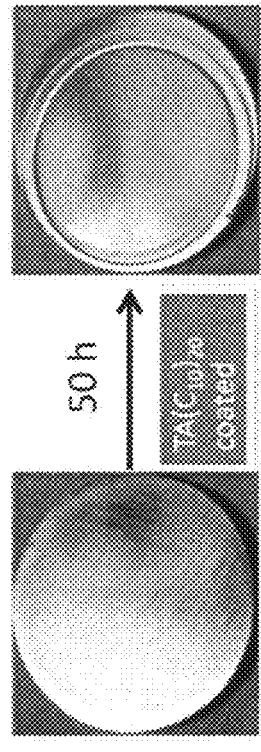

TA coated (control)

TA(C$_6$)$_{10}$ coated

TA(C$_{10}$)$_{10}$ coated

TA(C$_{16}$)$_{10}$ coated

METHOD OF FORMING ANTI-RUST OR ANTI-BACTERIAL FILM CONTAINING TANNIC ACID DERIVATIVES

CROSS-REFERENCE TO RELATED APPLICATION

The present application is a continuation application of U.S. patent application Ser. No. 15/526,208 filed on May 11, 2017, which is National Phase of International Application No. PCT/JP2015/081600 filed Nov. 10, 2015, which claims priority from Japanese Application No. 2014-228667, filed Nov. 11, 2014, the disclosure of which is hereby incorporated by reference herein in its entirety.

FIELD OF THE ART

The present invention relates to a method of forming an anti-rust or anti-bacterial film containing a tannic acid derivative, and more specifically, to a method of forming an anti-rust or anti-bacterial film containing a tannic acid derivative having a predetermined chain hydrocarbon group, which has rust prevention, antibacterial, sterilization, pasteurization capabilities.

BACKGROUND ART

Element magnesium (Mg), being abundant on the earth's surface, light in weight, tough and well capable of being cast, has wide applications as parts of wheels, airplanes, and cellular phones. Because of being vulnerable to corrosion, however, Mg gets easily corroded with generation of hydrogen as it is immersed in an acidic solution, an alkaline solution or saline; there have been a variety of rust preventives developed for the purpose of protecting the surfaces of metal substrates such as Mg and Mg alloy substrates.

For instance, Patent Publication 1 discloses how to manufacture rustproof, anticorrosive iron materials without recourse to harmful chromium compounds, and Patent Publication 2 discloses a hexavalent chromium-free, surface-treated metal sheet and how to produce it.

Tannin, a sort of polyphenols, has been used as rust preventives since before to form a stable film typically on the surface of zinc as well known in the art (see Non-Patent Publication 1). However, tannin has only limited use because of being hardly soluble in an organic solvent. To provide a solution to this, it has been known in the art that at least some of hydroxyl groups contained in the tannin molecule are substituted by an alkyl ether or an alkyl ester to obtain a water-insoluble tannic acid derivative (Patent Publication 3).

PRIOR ARTS

Patent Publications

Patent Publication 1: JP(A) 2004-197151
Patent Publication 2: JP(A) 2009-249690
Patent Publication 3: JP(A) 2004-307362

Non-Patent Publication

Non-Patent Publication 1: "Metal Surface Technology", Vol. 29, No. 1, pp 38-42, 1978

SUMMARY OF THE INVENTION

Objects of the Invention

It has been assumed that the abovementioned stable film comprises a film portion formed by reactions of gallic acid, etc. in tannic acid with zinc and another film portion formed by cohesive or associative polymerization of tannic acid and superposed on the first-mentioned film portion (Non-Patent Publication 1, FIG. 10 and Page 42, left column relating thereto). What takes part in these reactions is a hydroxyl group of gallic acid, etc. contained in tannic acid; hence, it is predicted that substitution of this hydroxyl group by an alkyl ether or the like would make film formation difficult, resulting in being less effective for rust prevention. In Patent Publication 1 too, the effect on rust prevention is thus estimated exclusively in a solution state.

Surprisingly, however, the inventors have now found that as a result of study after study made for the purpose of providing a rust preventive having a higher effect on rust prevention than ever before, the aforesaid alkyl ether derivative is capable of forming a film pursuant to a mechanism quite different from that of tannic acid, said film producing a variety of effects inclusive of a rustproof effect, and have arrived at the invention disclosed herein.

Embodiments of the Invention

With the foregoing in mind, the present invention provides a film-forming composition containing a tannic acid derivative in which hydrogen atoms in at least some hydroxyl groups in tannic acid are substituted by a chain hydrocarbon group having 3 to 18 carbon atoms.

Advantages of the Invention

The inventive film-forming composition as described above is capable of forming a stable film on various substrates. A study of what mechanism that film is formed in gets just started, but the reason would appear that molecules of the tannic acid derivative line up with the chain hydrocarbon groups arranged side by side, resulting in their orientation in good order. This orientation contributes more to stabilization of the film, outweighing the reduction in hydroxyl groups, and allows that film to have a variety of functions inclusive of rust prevention, antibacterial activity and pasteurization, all much more improved than a cohesive film of tannic acid.

BRIEF EXPLANATION OF THE DRAWINGS

FIG. 1 shows a chemical reaction process indicative of one exemplary derivatization of tannic acid.

FIG. 2($a$) is a photograph taken of the external view of tannic acid powders, FIG. 2($b$) is a photograph of the external view of the tannic acid powders upon added to water, and FIG. 2($c$) is a photograph of the external view of the tannic acid powders upon added to chloroform.

FIG. 3 is a photograph taken of an exemplary tannic acid derivative.

FIG. 4($a$) is a photograph taken of the external view of an exemplary tannic acid derivative, FIG. 4($b$) is a photograph of the tannic acid derivative upon added to water, and FIG. 4($c$) is a photograph of the tannic acid derivative upon added to chloroform.

FIG. 5 is indicative of the FT-IR spectra of derivatives prepared in Comparative Example 1 (tannic acid: TA), Example 1 (TA(C$_{10}$)$_5$), Example 2 (TA(C$_{10}$)$_{10}$), Example 3 (TA(C$_{10}$)$_{15}$), and Example 4 (TA(C$_{10}$)$_{20}$).

FIGS. 14A, 14B, 14C, 14D, 14E, 14F, 14G, and 14H are photographs taken of the external view of each sample in Rust Prevention Testing 4.

MODES FOR CARRYING OUT THE INVENTION

Figure 6:
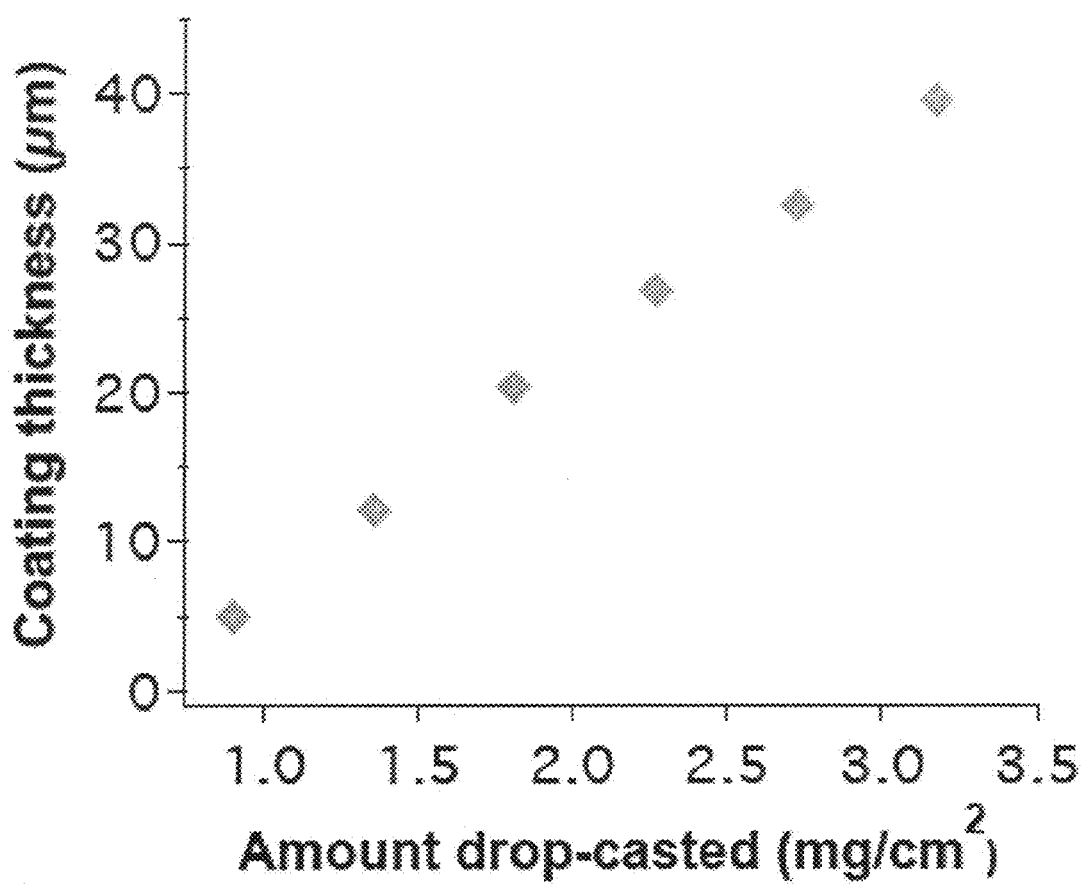
FIG. 6 is graphically illustrative of the relations between the coating amount by drop-casting on a substrate and the film thickness.

Tannin is a general term of plant components that yield polyvalent phenols via hydrolysis, and are roughly broken down into a hydrolysis type tannin in which the ester bonding of gallic acid or ellagic acid to sugars such as glucose makes it susceptible to hydrolysis by acids or enzymes, and a condensation type tannin formed by the polymerization of a compound having a flavanol skeleton. Both types of tannin may be used alone or in admixture for derivatization that would appear to result in the advantages contemplated herein. Preference is given to the hydrolysis type tannin; for instance, a hydrolysis type tannin composed mainly of tannic acid represented by the following formula (1) may be derivatized. It is here noted that the tannic acid used in the examples given later is a naturally occurring material that originates from the gall of Japanese sumac and can contain substances occurring as by cleavage or recombination of the ester bond of gallic acid or ellagic acid in the process of extraction or purification; however, it has been well established that such tannic acid can be effective for rust prevention, sterilization, etc.

Formula (1)

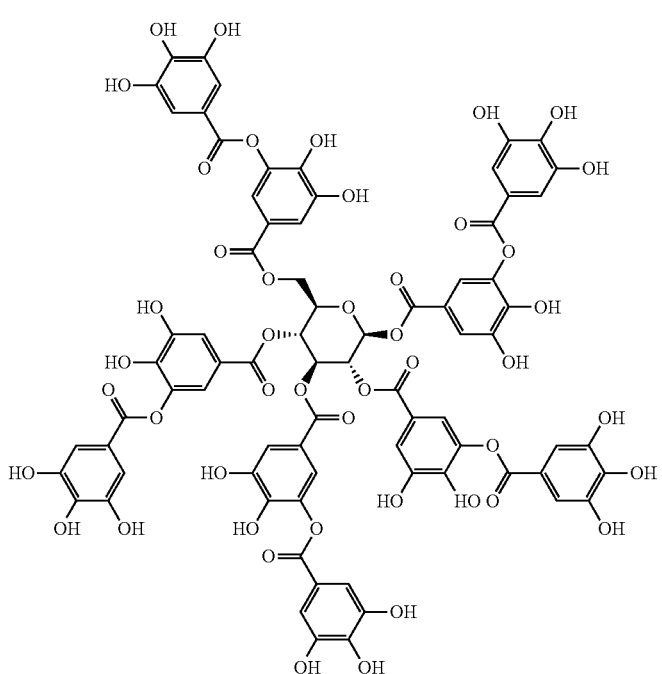

(1)

While tannic acid includes a plurality of hydroxyl groups, it is to be understood that hydrogen atoms in at least some of the plurality of hydroxyl groups in the inventive derivative are substituted by a chain hydrocarbon group having 3 to 18 carbon atoms. The total number of hydroxyl groups in the starting material tannic acid varies from type to type. Preferably at least 10%, more preferably at least 20%, and most preferably at least 40% of hydroxyl groups may be substituted. In the case of Formula (1) as an example, the total number of hydroxyl groups is 25, of which at least one, preferably at least three, more preferably at least five, and most preferably at least ten are substituted.

The upper limit to the number of substituents varies depending on the type of substituent, the substrate to be used, and what purpose it is used for. If the desired fixability is achieved for the substrate to be used, all the hydroxyl groups may be substituted. Upon application to polar substrates such as metal or glass substrates, preferably at most 80%, and more preferably at most 60% of hydroxyl groups should be substituted. In the case of Formula (1) as an example, preferably at most 20, and more preferably at most 15 hydroxyl groups should be substituted.

The chain hydrocarbon group having 3 to 18 carbon atoms includes a linear or branched alkyl, alkenyl or alkynyl group, each being bonded to the tannic acid skeleton via a bond including an oxygen atom originating from the hydroxyl group. Included in the linear hydrocarbon group are specifically a butyl group, a hexyl group, a heptyl group, an octyl group, an isooctyl group, a nonyl group, an isononyl group, a decyl group, an undecyl group, a dodecyl group, a hexadecyl group, a propylene group, a hexylene group, a hexadecenyl group, an octadecenyl group, etc., and that linear hydrocarbon group has preferably 4 to 18, and more preferably 6 to 16 carbon atoms. The bond containing the oxygen atom, for instance, includes an ether bond, an ester bond, and a urethane bond. While even other groups than that linear hydrocarbon groups may have an ability to form films, it is to be understood that most of the ability of tannic acid derivatives to form films is still unknown and has yet to be clarified, as described above.

The tannic acid derivatives here may be obtained by the Williamson ether synthesis method that is one of alkylation reactions. Specifically, a tannic acid derivative may be prepared by reaction of an alkyl halogenide to tannic acid in a solvent such as tetrahydrofuran, and dimethyl sulfoxide under the presence of a basic catalyst. For the basic catalyst, one or two or more catalysts selected from the group of consisting of MH, $M_2CO_3$ and M (M: an alkaline metal) may be used. For instance, $K_2CO_3$ may convert an OH group into $O^-M^+$ for acceleration of nucleophilic reaction of an $O^-$ group into an alkyl halogenide ($X$–$R_1$: X: halogen, $R_1$: an alkyl group). For the alkyl halogenide, for instance, an alkyl iodide may be used and instead of the alkyl halogenide, a compound including a sulfonyl group as a leaving group may be used. An alkylation reaction other than the Williamson ether synthesis method may also be used. A dehydration condensation reaction with carboxylic acids using a condensing agent like N,N'-dicyclohexylcarbodiimide (DCC) or a condensation reaction with an isocyanate may further be used.

The reaction may be carried out about 1-hour heating at 70° C. to 100° C. inclusive. FIG. 1 is indicative of one example of derivatization of tannic acid represented by Formula (1). There is an example shown in which heating is carried out at 85° C. in DMF using $K_2CO_3$ as the basic catalyst for synthesis of a derivative having nine decyl groups (TA $(C_{10})_9$). By varying the molar ratio of the alkyl halogenide to tannic acid, it is possible to set the value of n that stands for the number of alkyl groups introduced into tannic acid as desired.

The inventive composition is capable of forming films. For instance, upon removal of a solvent after application of that composition in a solution form to a substrate, it remains as a film on the substrate. That film is not necessarily a continuous one; it may be discontinuously formed as by spraying. The tannin derivative may also be crosslinked or otherwise mixed with a matrix such as resin for the purpose of improving on its durability or the like. The crosslinking agent may be premixed with the inventive composition or, alternately, it may be added to the inventive composition upon its application to a substrate.

The inventive composition may be used in various applications making use of various actions and film-formation capability of the tannic derivative. For instance, it may be provided in the form of rust preventives, antioxidants, disinfectants, bactericides/sterilizers, and antibacterial agents. There is also no limitation on an associated substrate that is selected from a wide range of substrates inclusive of metals, metal oxides, resins, elastomers, polymers, inorganic materials, concretes, mortars, woods, and animal or human skins.

The inventive composition may be available in various forms; for instance, it may be provided in a paste, gel, emulsion, and spray form. The inventive composition in a solution or paste form contains at least one solvent, for which there is the mention of an alcoholic solvent such as propylene alcohol and butanol, an ether solvent such as ethylene glycol monomethyl ether and ethylene glycol monopropyl ether, an ester solvent such as ethyl acetate and isobutyl acetate, and a ketone solvent such as methyl ethyl ketone with the proviso that the tannic acid derivative can be dissolved in them.

The inventive composition in an emulsion form such as a cream or latex form contains a mixed solvent of water and an organic solvent compatible with water such as an alcohol. There is no limitation on an emulsion form; any one of the oil-in-water (o/w), water-in-oil (w/o) and w/o/w type emulsions may be used. For preparation, the tannic acid derivative may be directly dispersed in water or, alternatively, an organic solvent solution of the tannic acid derivative may be dispersed in water. Further, an emulsion may be prepared in a mixed solvent of water and an organic solvent that is compatible with water, and the organic solvent alone is volatilized off to obtain an aqueous dispersion.

The inventive composition in a spray form contains a liquefied or compressed gas acting as a blasting or injecting agent. For the liquefied gas there is the mention of liquefied petroleum gas, dimethyl ether or the like, and for the compressed gas there is the mention of carbon dioxide, nitrogen and such. This carbon dioxide may be a supercritical fluid exceeding the critical point for use in industrial pasteurization processes or the like.

The inventive composition may be prepared by mixing a tannic acid derivative in such an amount as to provide a concentration depending on purpose with such components as mentioned above in a conventional method. The concentration of the tannic acid derivative may be varied depending on what purpose it is for, and how to coat it. The inventive compositions may each be blended with common additives such as surface active agent, dispersants, defoamers, leveling agents, pH regulators, crosslinking agents, fillers and so on in a range without detriment to the object(s) of the invention.

The film may be formed in any desired way inclusive of bar coating, spin coating, dipping, and spraying. The thickness of the film is not limited too; it may be adjusted depending on what purpose the film is used for. Take a rust preventive film as an example. The thickness is preferably at least 100 nm. Below 100 nm, it may be hard to prevent water molecules from coming close to the surface of a metal or alloy substrate, resulting in a failure to obtain any sufficient effect on rust prevention.

EXAMPLES

The present invention is explained with reference to its specific examples, but it is not limited by these examples.

Comparative Example 1

(Preparation of Materials and Estimation of Properties)

Tannic acid powders (WAKO, 203-06331) were kept at the ready. FIG. 2(a) is a photograph taken of the external view of tannic acid powders, FIG. 2(b) is a photograph of the external view of tannic acid powders upon added to water, and FIG. 2(c) is a photograph of the external view of tannic acid powders upon added to chloroform. As shown in FIG. 2(a), the tannic acid powders were ocher powders. The tannic acid was dissolved in water, but not in chloroform ($CHCl_3$). This tannic acid material was used for Comparative Example 1.

In Examples 1 to 8 given below, the aforesaid tannic acid (hereinafter often abbreviated as TA) and an alkyl iodide were dissolved in DMF to obtain a solution to which the alkyl iodide (n-decyl iodide, n-hexyl iodide, and n-hexadecyl iodide) and an equal amount of $K_2CO_3$ were added, whereupon the solution was heated at 85° C. for 8 hours to synthesize the tannic acid derivatives set out in Table 1. In what follows, a tannic acid derivative having n substituents having m carbon atoms is abbreviated as "TA(Cm)n".

TABLE 1

| Compounds | Alkyl Iodide (wt. %) | Tannic Acid (wt. %) | φ-OH Rate of Derivatization (mol %) | Yields (%) |
|---|---|---|---|---|
| $TA(C_6)_5$ | $C_6H_{13}I$ (38) | 62 | 20 | 73 |
| $TA(C_6)_{10}$ | $C_6H_{13}I$ (55) | 45 | 40 | 87 |
| $TA(C_{10})_5$ | $C_{10}H_{21}I$ (44) | 56 | 20 | 88 |
| $TA(C_{10})_{10}$ | $C_{10}H_{21}I$ (61) | 39 | 40 | 74 |
| $TA(C_{10})_{15}$ | $C_{10}H_{21}I$ (70) | 30 | 60 | 76 |
| $TA(C_{10})_{20}$ | $C_{10}H_{21}I$ (76) | 24 | 80 | 94 |
| $TA(C_{16})_5$ | $C_{16}H_{33}I$ (51) | 49 | 20 | 72 |
| $TA(C_{16})_{10}$ | $C_{16}H_{33}I$ (67) | 33 | 40 | 61 |

Example 1

Under the aforesaid synthesis conditions in a tannic acid concentration of 56 wt % and a n-decyl iodide concentration of 44 wt %, $TA(C_{10})_5$ represented by Chemical Formula (2) was synthesized. FIG. 3 is a photograph taken of the external view of the resultant derivative that was a gel-like substance. Note here that m in Formula (2) was m=10 and the yield was 88%. The number of the substituents introduced was calculated from the rate of the charged tannic acid and n-decyl iodide.

Formula (2)

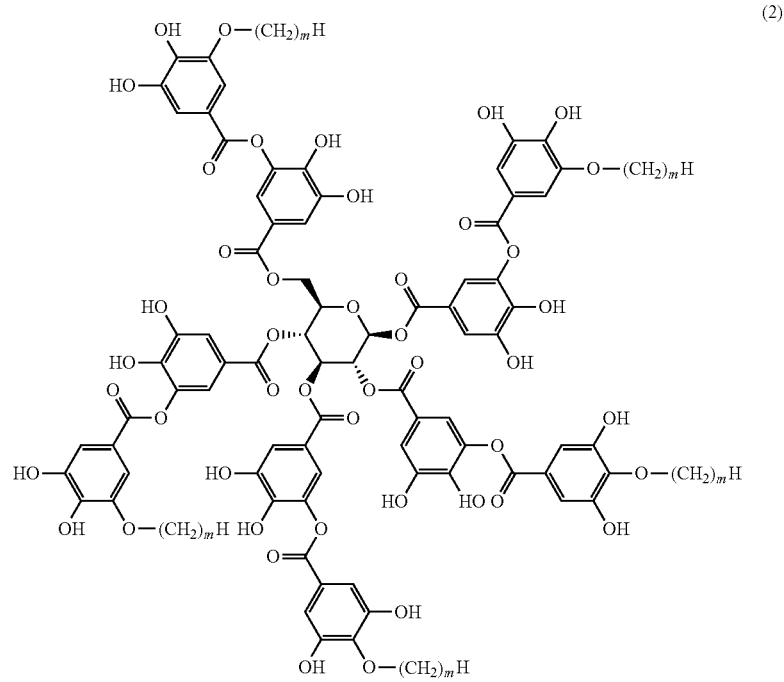

(2)

FIG. 4(a) is a photograph taken of the external view of the derivative, and FIGS. 4(b) and 4(c) are photographs taken of the external views of the derivative upon added to water and chloroform, respectively. As shown in FIG. 4(a), the derivative was in a partly gelled powdery form, and as shown in FIG. 4(b), the derivative was not dissolved in water. As shown in FIG. 4(c), the powders of the derivative were dissolved in CHCl$_3$.

Example 2

TA(C$_{10}$)$_{10}$ represented by Chemical Formula (3) was synthesized with the concentrations of tannic acid and n-decyl iodide changed to 39 wt % and 61 wt %, respectively, under the otherwise same synthesis conditions as in Example 1. Note here that m=10 in Formula (3). The yield was 74%.

Formula (3)

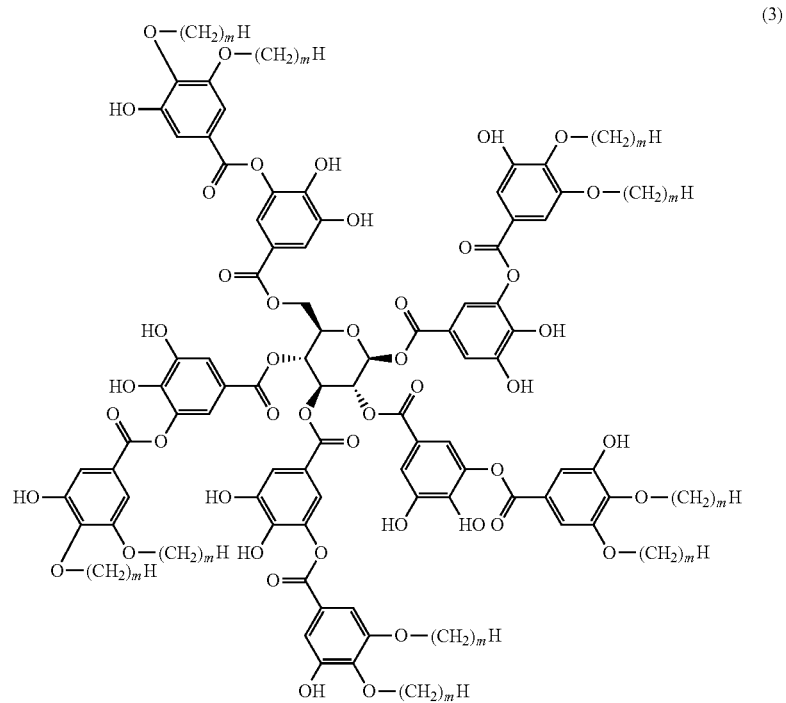

(3)

Example 3

TA(C$_{10}$)$_{15}$ represented by Chemical Formula (4) was synthesized with the concentrations of tannic acid and n-decyl iodide changed to 30 wt % and 70 wt %, respectively, under the otherwise same synthesis conditions as in Example 1. Note here that m=10 in Formula (4). The yield was 76%.

Formula (4)
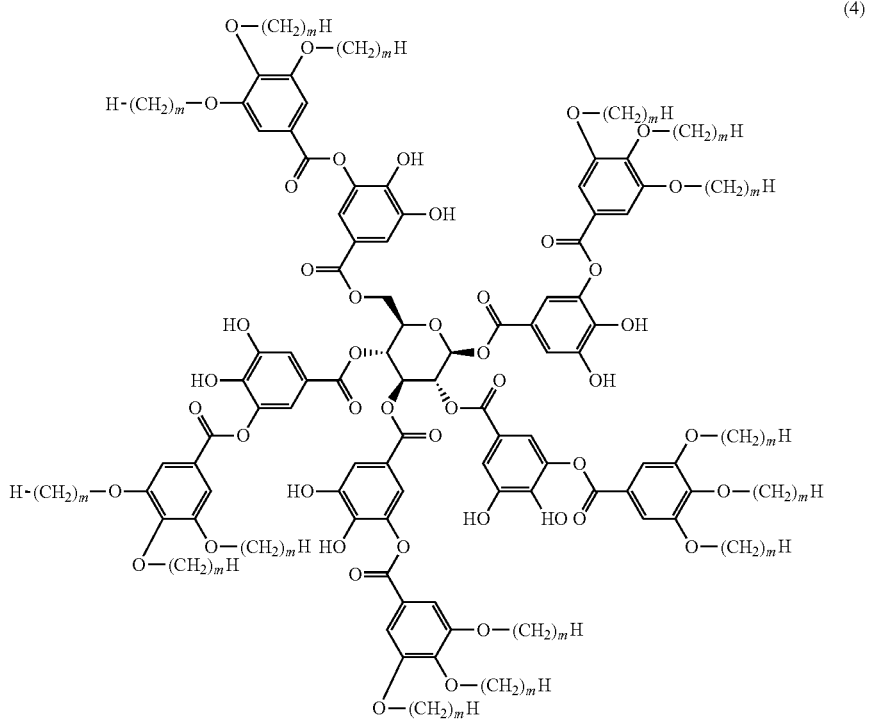
Example 4
TA(C$_{10}$)$_{20}$ represented by Chemical Formula (5) was synthesized with the concentrations of tannic acid and n-decyl iodide changed to 24 wt % and 76 wt %, respectively, under the otherwise same synthesis conditions as in Example 1. Note here that m=10 in Formula (5). The yield was 94%.
Formula (5)
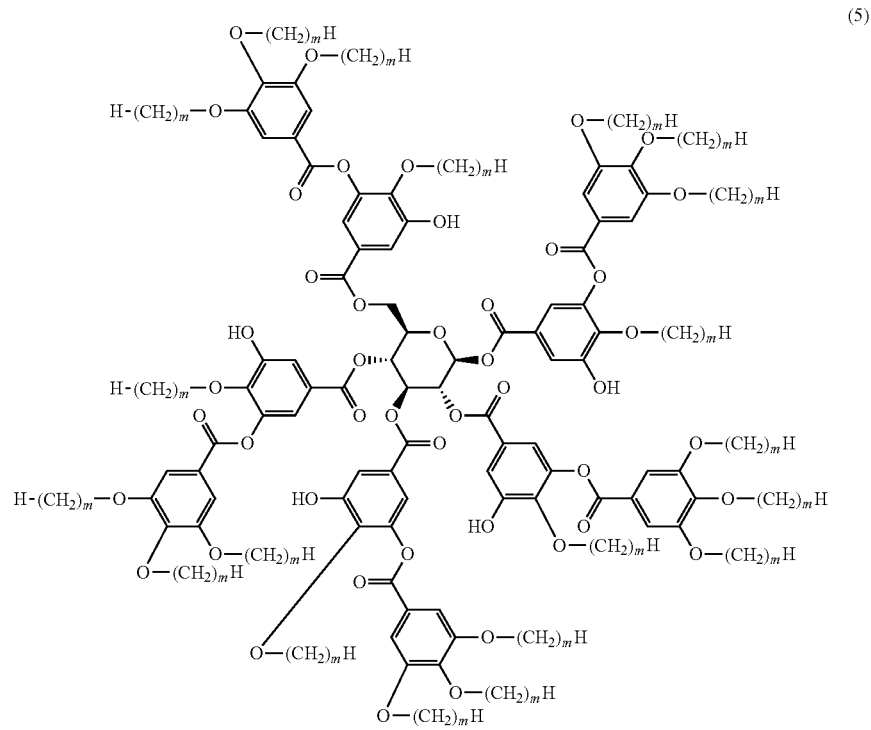

Example 5

Using tannic acid in a concentration of 62 wt % and n-hexyl iodide in a concentration of 38 wt %, TA($C_6$)$_5$ was synthesized under the otherwise same synthesis conditions as in Example 1. The yield was 73%.

Example 6

Using tannic acid in a concentration of 45 wt % and n-hexyl iodide in a concentration of 55 wt %, TA($C_6$)$_{10}$ was synthesized under the otherwise same synthesis conditions as in Example 1. The yield was 87%.

Example 7

Using tannic acid in a concentration of 49 wt % and n-hexadecyl iodide in a concentration of 51 wt %, TA($C_{16}$)$_5$ was synthesized under the otherwise same synthesis conditions as in Example 1. The yield was 72%.

Example 8

Using tannic acid in a concentration of 33 wt % and n-hexadecyl iodide in a concentration of 67 wt %, TA($C_{16}$)$_{10}$ was synthesized under the otherwise same synthesis conditions as in Example 1. The yield was 61%.

(FT-IR Measurement)

The resultant derivatives were each measured by FT-IR (Fourier-transform infrared spectroscopy). The spectra of the derivatives obtained in Comparative Example 1 and Inventive Examples 1 to 4 were shown in FIG. 5 in a superposed manner. For each one of the inventive derivatives, there was an alkyl group peak found near 3000 $cm^{-1}$.

The film-forming composition according to the invention is useful for rust prevention as well as disinfection, pasteurization, sterilization or anti-bacterial activity. This film-forming composition was coated on a substrate such as a metal or glass to obtain materials (samples) having a rust preventive film and a pasteurizing/sterilizing film on the substrate, the effects of which are specifically indicated below.

(Rust Prevention Testing 1)

A Mg alloy rod (AZ31 made by Osaka Fuji Corporation, composed of 3.2% by mass Al, 0.93% by mass Zn, 0.4% by mass Mn, 0.04% by mass Si, 0.0038% by mass Cu, 0.0086% by mass Ni and 0.003% by mass Fe with the rest of Mg, and having a diameter of 1.5 cm) was cut to prepare a Mg alloy disc having a thickness of 4 mm. Then, this disc was polished by SiC paper on its surface, and cleaned with EtOH, $H_2O$ and acetone in this order to prepare the following disc test pieces (1) to (6).

(1) Uncoated sample of the Mg alloy (AZ31)
(2) Sample coated with TA($C_{10}$)$_5$ (Example 1) on the disc surface of the Mg alloy (AZ31)
(3) Sample coated with TA($C_{10}$)$_{10}$ (Example 2) on the disc surface of the Mg alloy (AZ31)
(4) Sample coated with TA ($C_{10}$)$_{15}$ (Example 3) on the disc surface of the Mg alloy (AZ31)
(5) Sample coated with TA($C_{10}$)$_{20}$ (Example 4) on the disc surface of the Mg alloy (AZ31)
(6) Sample coated with TA (Comparative Example 1) on the disc surface of the Mg alloy (AZ31)

TA used in Examples 1 to 4 and Comparative Example 1 was dissolved in tetrahydrofuran (THF) at 8 wt % to prepare a solution, 40 μL of which were added dropwise to a substrate and coated by casting. After evaporation of the solvent at room temperature, a one-hour annealing was carried out at 80° C.

FIG. 6 is graphically illustrative of the relations between the coating amount by drop-casting and the film thickness upon dried. As shown, the resultant film thickness depended linearly on the coating amount by drop-casting. The same goes true for all the samples and, based on this graph, all the films were assumed to have a film thickness of 20 μm upon dried.

Figure 7:
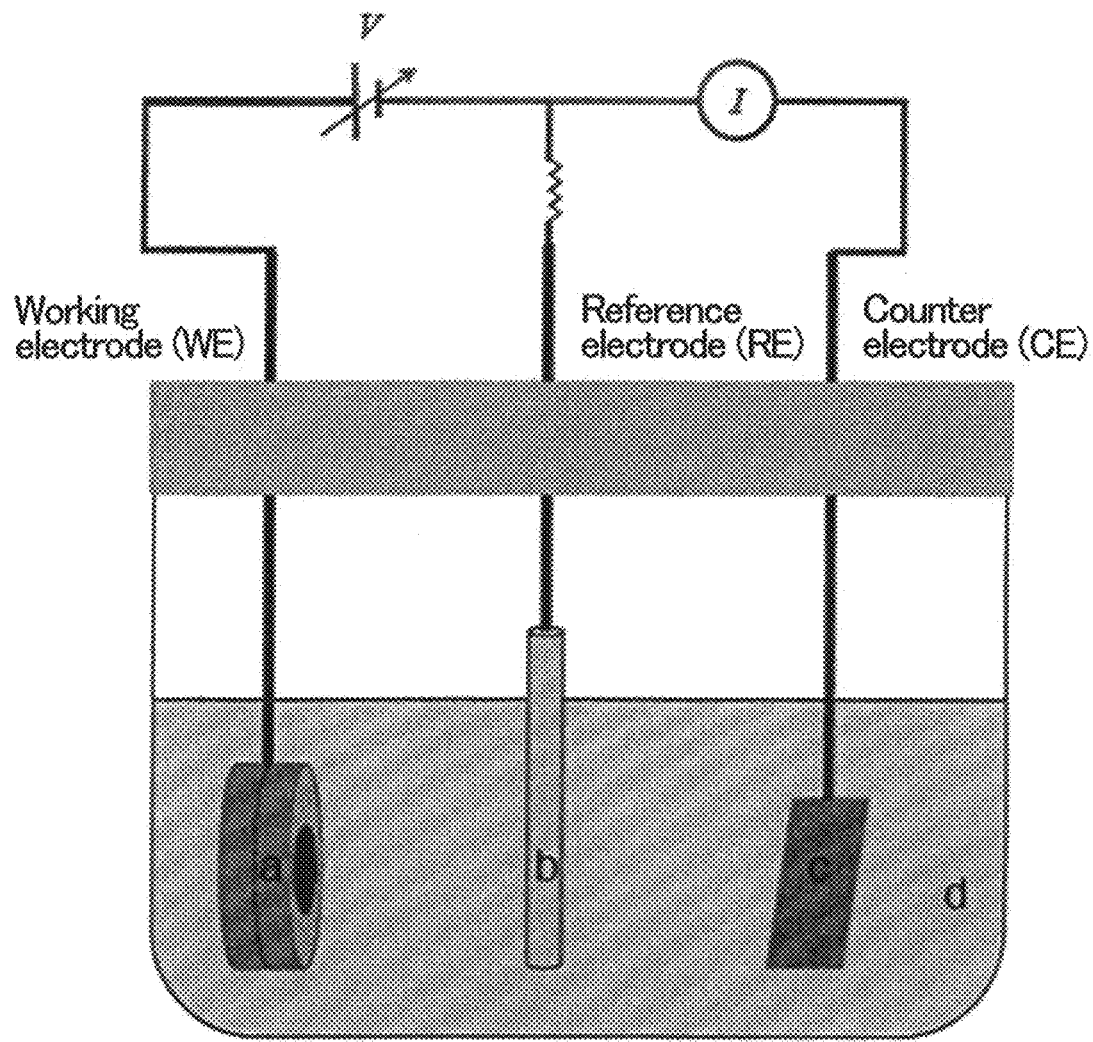
FIG. 7 is illustrative of the construction of an electrode assembly used for testing of the ability to prevent rust.

Using each of the resultant discs as a working electrode, a std. calomel electrode as a reference electrode, a platinum wire as a counter electrode, and a 3.5 wt % NaCl aqueous solution as an electrolyte solution, I-V (current-voltage) properties were measured in such arrangement as shown in FIG. 7. The scan speed was set at 1 mV/s.

Figure 8:
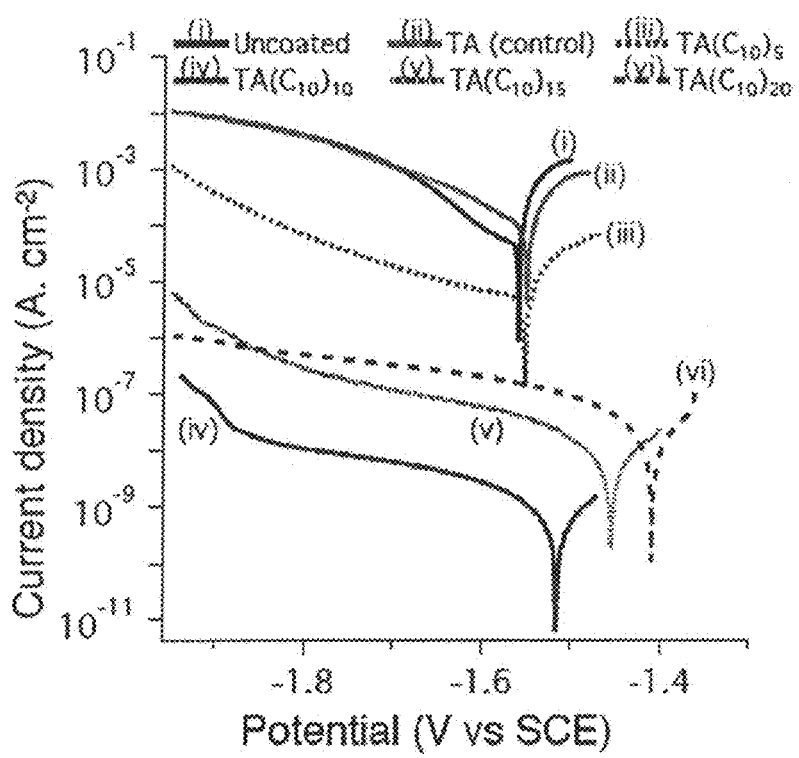
FIG. 8 is indicative of the results of measurement of cathodic current densities in Rust Prevention Testing 1.

FIG. 8 shows the results of measurement of cathodic current densities. The uncoated sample and Comparative Example 1 (TA) were much the same; the largest current passed through them. In other words, they were the most corrosion prone of all. On the other hand, TA($C_{10}$)$_{10}$ (Example 2) had the highest effect on rust prevention.

Figure 9:
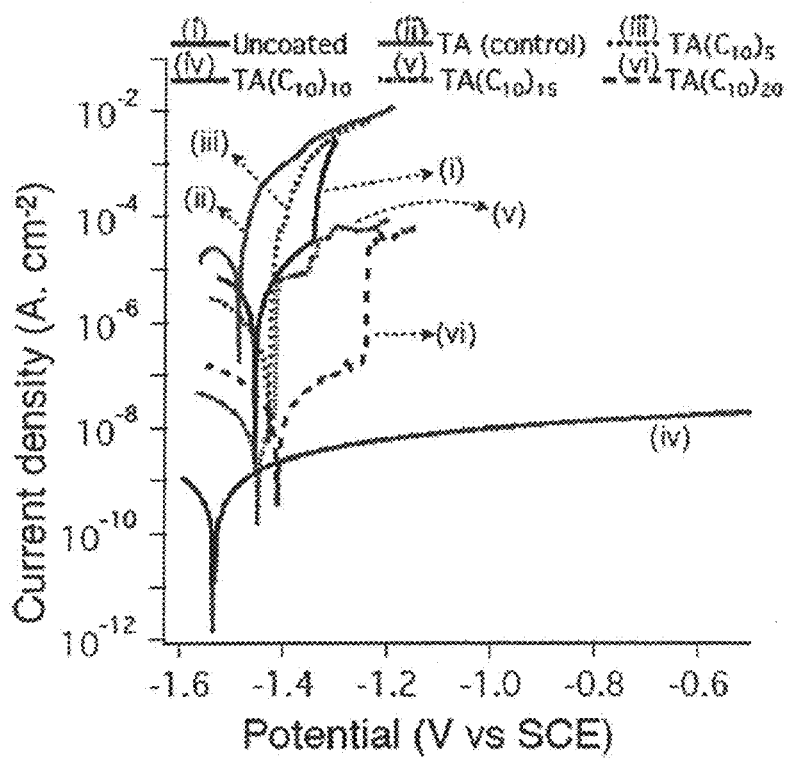
FIG. 9 is indicative of the results of measurement of anodic current densities in Rust Prevention Testing 1.

FIG. 9 shows the results of measurement of anodic current densities. Comparative Example 1 (TA) was the most corrosion prone of all. On the other hand, TA ($C_{10}$)$_{10}$ (Example 2) was found to have lower and less variable current values, and have the greatest effect on rust prevention.

(Rust Prevention Testing 2)

The I-V properties of the following four samples were measured as in Rust Prevention Testing 1.

(1) Uncoated sample of the Mg alloy (AZ31)
(2) Sample coated with TA($C_{10}$)$_{10}$ (Example 2) on the disc surface of the Mg alloy (AZ31)
(3) Sample coated with TA($C_6$)$_{10}$ (Example 6) on the disc surface of the Mg alloy (AZ31)
(4) Sample coated with TA($C_{16}$)$_{10}$ (Example 8) on the disc surface of the Mg alloy (AZ31)

Figure 10:
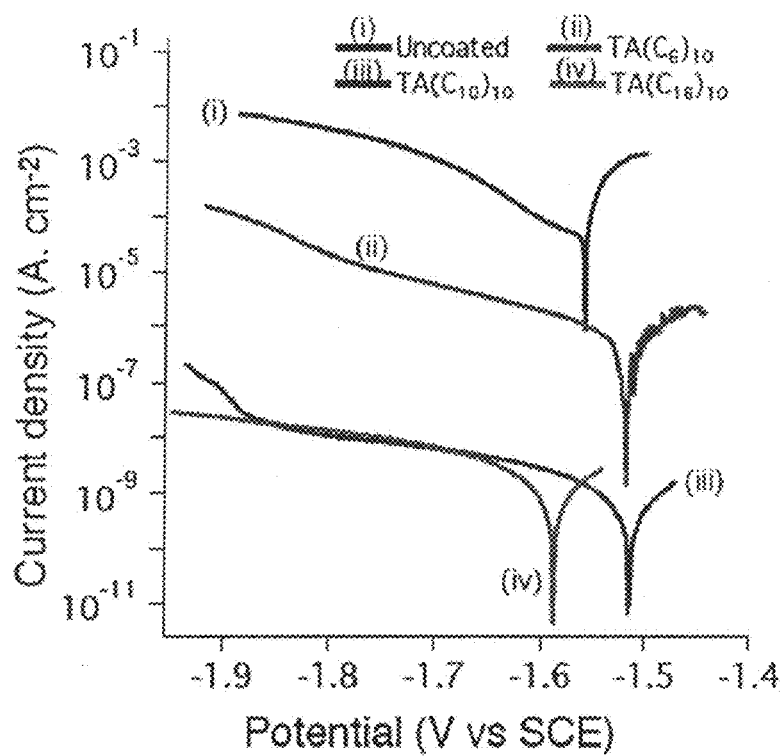
FIG. 10 is indicative of the results of measurement of cathodic current densities in Rust Prevention Testing 2.

FIG. 10 shows the results of measurement of cathodic current densities. The uncoated sample was the most corrosion prone of all. On the other hand, TA($C_{10}$)$_{10}$ (Example 2) and TA($C_{16}$)$_{10}$ (Example 8) had much the same improved effect on rust prevention.

Figure 11:
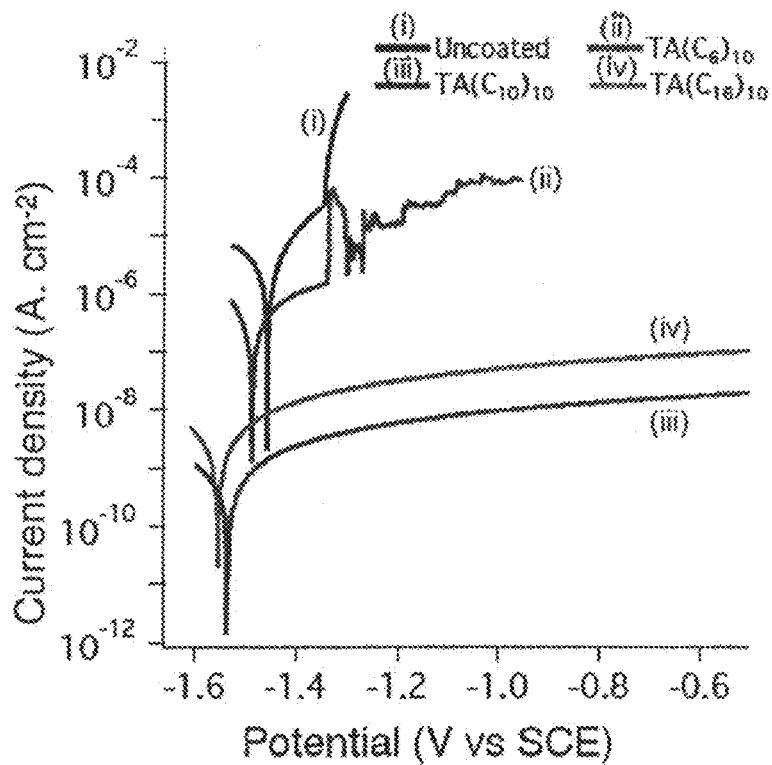
FIG. 11 is indicative of the results of measurement of anodic current densities in Rust Prevention Testing 2.

FIG. 11 shows the results of measurement of anodic current densities. The uncoated sample was the most corrosion prone of all. On the other hand, TA($C_{10}$)$_{10}$ (Example 2) was found to have lower and less variable current values, and have the most improved effect on rust prevention. TA($C_{16}$)$_{10}$ (Example 8) was also found to have less variable current values and have a significant effect on rust prevention.

(Rust Prevention Testing 3)

Figure 12:
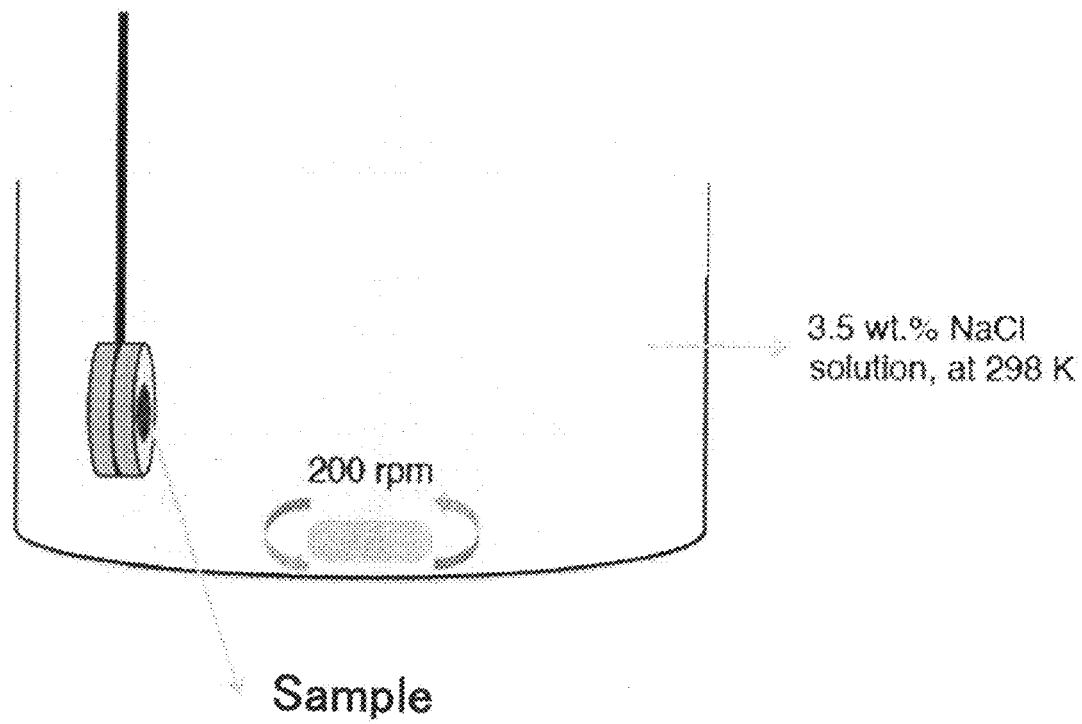
FIG. 12 is schematically illustrative of how to carry out immersion-in-saline-solution testing.

An uncoated sample of the Mg alloy (AZ31) and a sample coated with TA($C_{10}$)$_{10}$ on the disc surface of the Mg alloy (AZ31) (Example 2) were each subjected to immersion-in-saline-solution experimentation. As shown in FIG. 12, the solution was stirred during immersion using a stirring bar at 200 rpm. For the saline solution, a 3.5 wt % NaCl solution was used under a condition of 298 K.

Figure 13A:
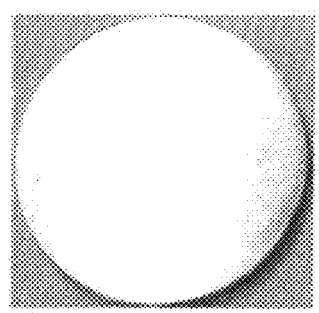
FIGS. 13A, 13B, 13C, and 13D are photographs taken of the external view of each sample in Rust Prevention Testing 3.
Figure 13B:
Figure 13C:
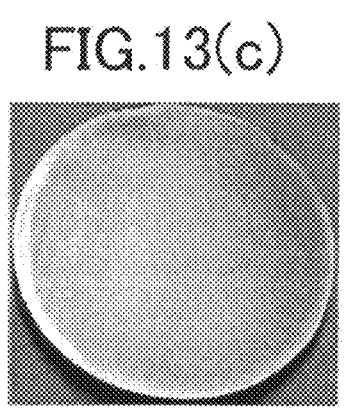
Figure 13D:
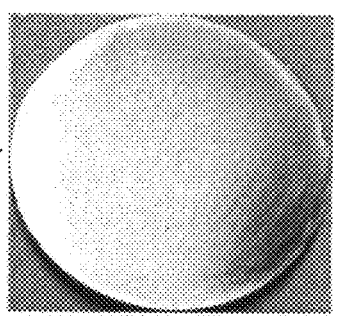

FIGS. 13(a) and 13(b) are photographs taken of the uncoated sample before and 2 hours after the immersion, respectively, and FIGS. 13(c) and 13(d) are photographs taken of the sample coated with TA($C_{10}$)$_{10}$ (Example 2) before and 50 hours after the immersion, respectively. Eighty % of the surface of uncoated sample got corroded in a scant 2-hours immersion, but the sample coated with TA($C_{10}$)$_{10}$ (Example 2) hardly corroded even after a 50-hours immersion.

(Corrosion Prevention Testing 4)

Immersion-in-saline-solution experimentation was carried out as in Rust Prevention Testing 3 with the exception of using a sample coated with TA (Comparative Example 1) (TA coated (control)), a sample coated with $TA(C_{10})_{20}$ (Example 4) ($TA(C_{10})_{20}$ coated), a sample coated with $TA(C_{10})_5$ (Example 1) ($TA(C_{10})_5$ coated), and a sample coated with $TA(C_{10})_{15}$ (Example 3) ($TA(C_{10})_{15}$ coated).

Photographs taken of the samples before and 50 hours after the immersion are shown in FIGS. 14A, 14B, 14C, 14D, 14E, 14F, 14G, and 14H. Fifty hours after the immersion, the TA coated sample got noticeably corroded on its surface with a partial peeling, and the $TA(C_{10})_5$ coated sample got slightly corroded. On the other hand, both the $TA(C_{10})_{20}$ and $TA(C_{10})_{15}$ samples got hardly corroded even 50 hours after the immersion.

(Rust Prevention Testing 5)

$TA(C_{10})_{10}$ (Example 2) coated samples having film thicknesses of 12, 27, 32 and 40 μm inclusive of 20 μm were prepared to measure corrosion currents. The corrosion current is defined by the rate of corrosion at a corrosion potential.

Figure 15:
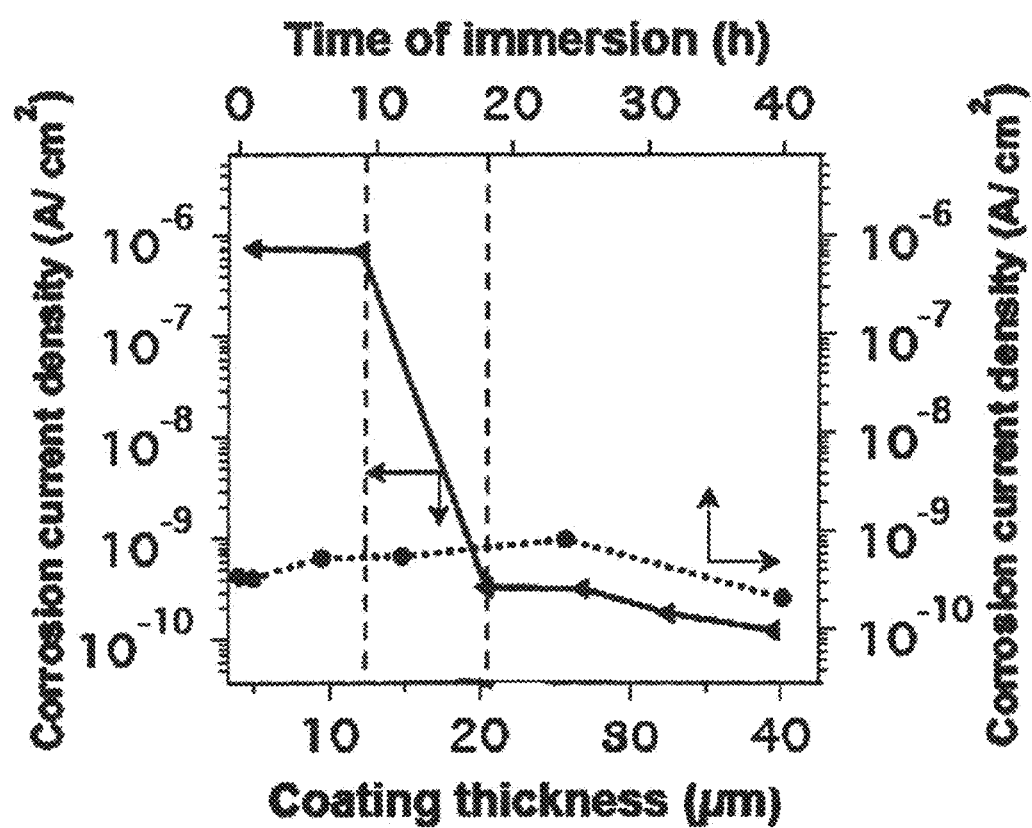
FIG. 15 is a graphically illustrative of film thickness vs. corrosion current density relations and immersion time vs. corrosion current density relations.

A graph of FIG. 15 with left ordinate and lower abscissa as references is indicative of film thickness vs. corrosion current density relations. It has now been found that there are a decreasing corrosion density and a higher effect on rust prevention as the film thickness grows more than 20 μm.

Then, the aforesaid 20 μm-thick sample was measured in terms of dependency of the corrosion current density on immersion time. The results are shown in FIG. 15 with right ordinate and upper abscissa as references. For 0 hour up to 40 hours, there was no or little change in the corrosion current density.

(Rust Prevention Testing 6)

Figure 16:
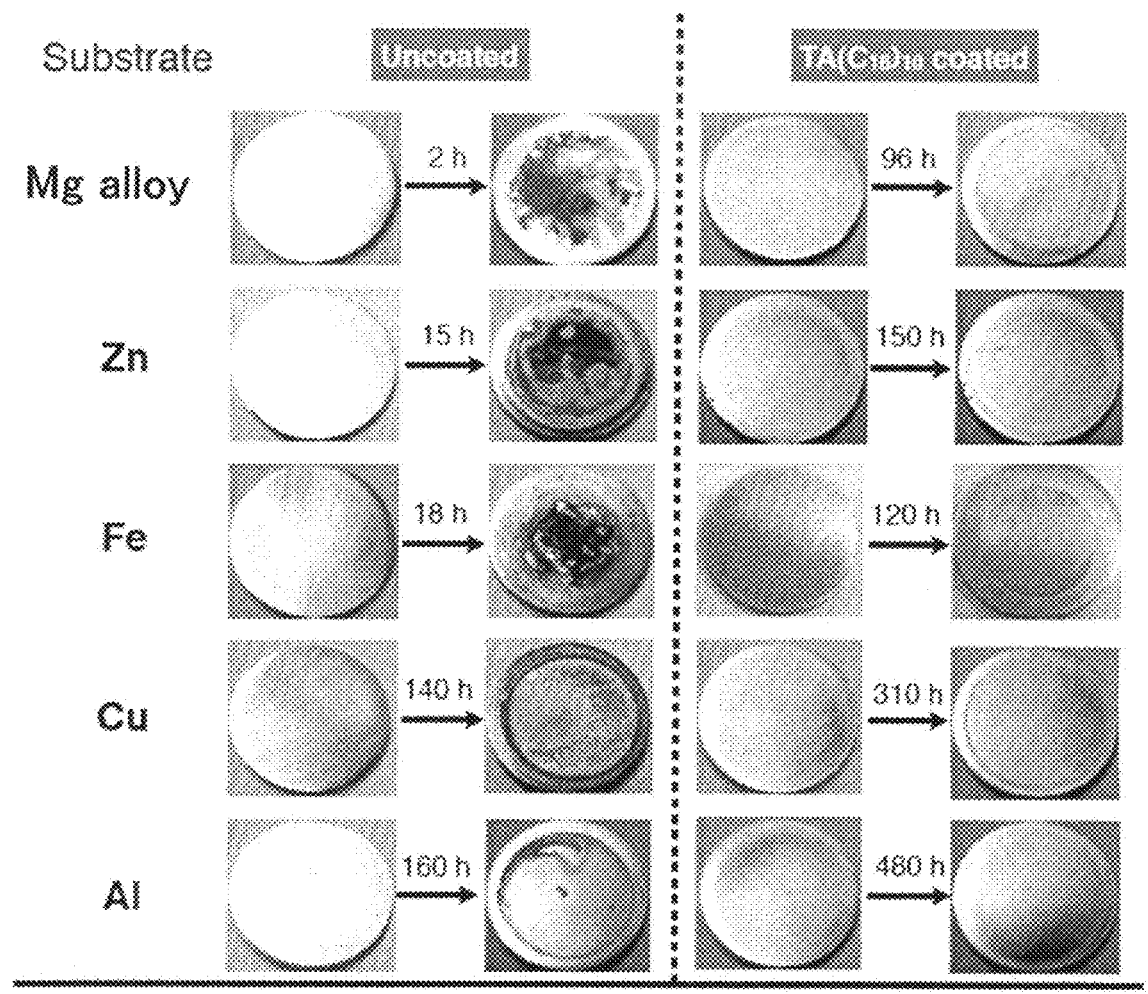
FIG. 16 is photographs indicative of the results of immersion-in-saline-solution testing.

An uncoated sample and a $TA(C_{16})_{10}$ (Example 8)-coated sample were formed using substrates of the Mg alloy as well as Zn, Fe, Cu, and Al respectively for immersion-in-saline-solution experimentation. Photographs of these samples are shown in FIG. 16. Referring to the uncoated samples, all metals got corroded by immersion in saline solution for a given time of period whereas, referring to the $TA(C_{16})_{10}$ coated samples, all the metals remained intact.

(Ability to Form Films on Glass Substrate)

Using TA (Comparative Example 1), $TA(C_6)_{10}$ (Example 6), $TA(C_{10})_{10}$ (Example 2), and $TA(C_{16})_{10}$ (Example 8), respectively, a film was formed by drop-casting on a 5 cm×5 cm glass substrate. Preparing a THF solution, drop-casting of the THF solution in an amount of 1.1 mg/cm² was followed by annealing under the conditions of 1 hour and 80° C. to prepare a drop-cast film.

Figure 17A:
FIGS. 17A, 17B, 17C, and 17D are photographs indicative of films on glass substrates.
Figure 17B:
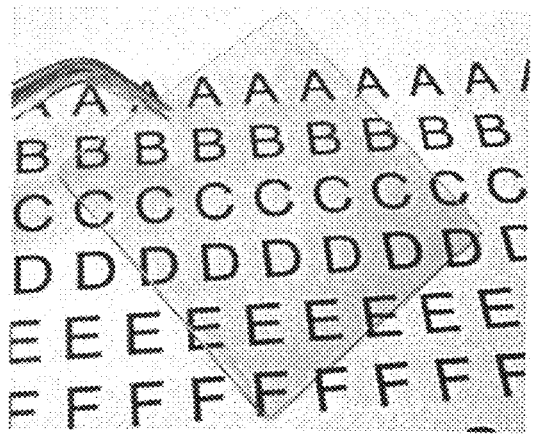
Figure 17C:
Figure 17D:
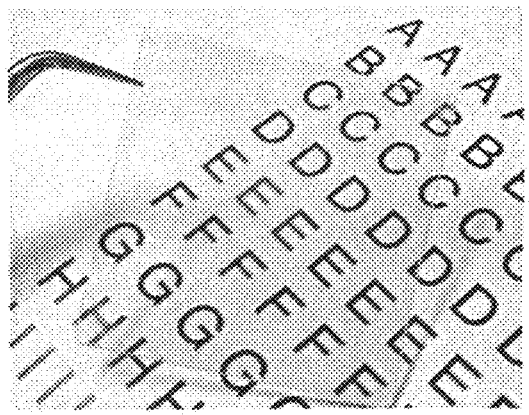

FIG. 17(a) is a photograph taken of a tannic acid film; FIG. 17(b) is a photograph of a $TA(C_6)_{10}$ film; FIG. 17(c) is a photograph of a $Ta(C_{10})_{10}$ film; and FIG. 17(d) is a photograph of a $Ta(C_{16})_{10}$ film. With TA, there could be no clear film formed on the glass with swelled wrinkles. On the other hand, the rest of the samples could all provide films of high transparency although they were slightly colored in light orange.

(Pasteurization/Sterilization Testing 1)

Figure 18:
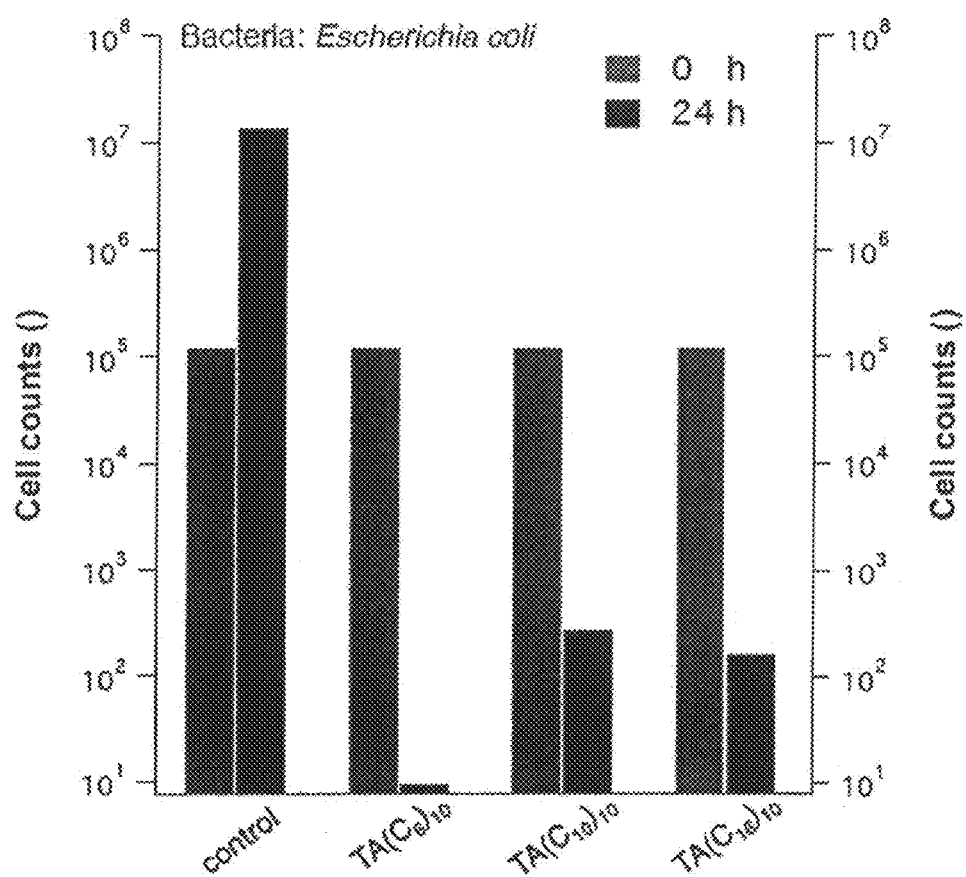
FIG. 18 is graphically illustrative of changes in the cell counts of *E. coli* scattered on a film formed on a glass substrate.

The TA (Comparative Example 1), $TA(C_6)_{10}$ (Example 6), $TA(C_{10})_{10}$ (Example 2), and $TA(C_{16})_{10}$ (Example 8) film was formed on the glass substrate by the aforesaid method, and colon bacilli (*E. Coli*) were scattered on it to observe changes in the surface of the film at room temperature. FIG. 18 is a graph representative of the results of proliferation of bacteria on the film. The cell count of colon bacilli scattered at the start (0 hour) was $1.2 \times 10^5$ CFU/mL. After the lapse of 24 hours, that cell count increased to $1.4 \times 10^7$ CFU/mL for the TA coated (control) film. In contrast, no or little bacilli (<10) were found on the $TA(C_6)_{10}$ film, indicating that there were noticeable effects on antibacterial activity and sterilization. After the lapse of 24 hours, the cell count went down to $2.7 \times 10^2$ CFU/mL for $TA(C_{10})_{10}$, and $1.6 \times 10^2$ CFU/mL for $TA(C_{16})_{10}$, indicating that there were effects on antibacterial activity and sterilization. A problem with tannic acid—known so far to be capable of pasteurization in the form of an aqueous solution—was that a tannic acid film is wrinkled up, running short of durability. Because of having a high solubility in water, tannic acid was incapable of aqueous testing such as antibacterial testing in a thin-film state. With the tannic acid derivative according to the invention, however, it is possible to reduce its solubility in water down to a very low level and, hence, to estimate its antibacterial activity in a thin-film state for the first time. It is here to be noted that the unit CFU/mL is an abbreviation of a colony forming unit indicative of a quantitative unit used in the inspection of bacteria in foods or a unit of the quantity of bacteria. For instance, a unit count of 20 CFU/mL capable of colony formation means that there are 20 bacteria present in 1 mL.

Likewise, golden staphs (*S. Aureus*) or methicillin-resistant *Staphylococcus Aureus* (MRSA) were scattered to make studies of effects on antibacterial activity and pasteurization. Set out in Table 2 are the results of effects on antibacterial activity and pasteurization against *E. Coli, S. Aureus* and MRSA.

TABLE 2

|  | E. Coli | | S. Aureus | |
| --- | --- | --- | --- | --- |
|  | 0 hour | 24 hours | 0 hour | 24 hours |
| Control | $1.2 \times 10^5$ | $1.4 \times 10^7$ | $1.1 \times 10^5$ | $1.1 \times 10^5$ |
| $TA(C_6)_{10}$ | $1.2 \times 10^5$ | <10 | $1.1 \times 10^5$ | <10 |
| $TA(C_{10})_{10}$ | $1.2 \times 10^5$ | $2.7 \times 10^2$ | $1.1 \times 10^5$ | <10 |
| $TA(C_{16})_{10}$ | $1.2 \times 10^5$ | $1.6 \times 10^2$ | $1.1 \times 10^5$ | <10 |

|  | MRSA | |
| --- | --- | --- |
|  | 0 hour | 24 hours |
| Control | $1.2 \times 10^5$ | $1.7 \times 10^5$ |
| $TA(C_6)_{10}$ | $1.2 \times 10^5$ | <10 |
| $TA(C_{10})_{10}$ | $1.2 \times 10^5$ | <10 |
| $TA(C_{16})_{10}$ | $1.2 \times 10^5$ | <10 |

Figure 19:
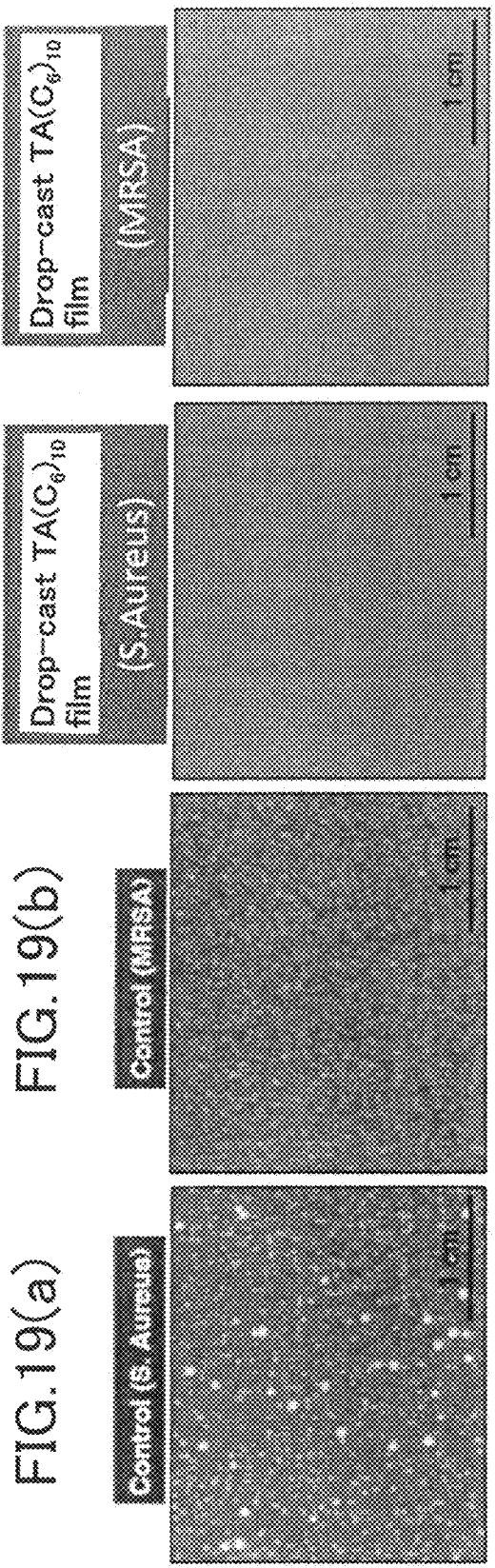
FIGS. 19A, 19B, 19C, and 19D are photographs taken of the surfaces of films 24 hours after scattering of *S. Aureus* ((a), (c)) and MRSA ((b), (d)) on the films formed on a glass substrate.

FIG. 19(a) is a photograph taken of the film surface 24 hours after scattering of *S. Aureus* on the TA coated (control) film; FIG. 19(b) is a photograph of the film surface 24 hours after scattering of MRSA on the TA coated (control) film; FIG. 19(c) is a photograph of the film surface 24 hours after scattering of *S. Aureus* on the drop-cast $TA(C_6)_{10}$ film; and FIG. 19(d) is a photograph of the film surface 24 hours after scattering of MRSA on the drop-cast $TA(C_6)_{10}$ film. As shown, $TA(C_6)_{10}$, $TA(C_{10})_{10}$ and $TA(C_{16})_{10}$ have been found to have effects on antibacterial activity and pasteurization against *S. Aureus* and MRSA.

(Pasteurization/Sterilization Testing 2)

$1.6 \times 10^5$ (CFU/mL) of MRSA were scattered on a $TA(C_6)_{10}$ film formed on a glass substrate (in a coating amount of 1.2 mg/cm²) according to the aforesaid method to make a study of cell count changes at room temperature over time. As can be seen from Table 3, it has been found that MRSA can be pasteurized within 2 hours.

TABLE 3

| 0 hour | 1 hour | 2 hours | 4 hours | 8 hours | 24 hours |
|---|---|---|---|---|---|
| Cell counts of MRSA (CFU/mL) | $1.6 \times 10^3$ | <10 | <10 | <10 | <10 |

(Pasteurization/Sterilization Testing 3)

As in Pasteurization/Sterilization Testing 2, $1.6 \times 10^5$ (CFU/mL) of MRSA were scattered on $TA(C_6)_{10}$ films having different thicknesses formed on a glass substrate according to the aforesaid method, and the cell counts of MRSA after the lapse of 24 hours were measured. As can be seen from Table 4, it has been found that MRSA can be pasteurized with no difficulty even when the film is as thin as 0.1 mg/cm².

TABLE 4

| | mg/cm² | | | | |
|---|---|---|---|---|---|
| | 1.2 | 0.8 | 0.4 | 0.2 | 0.1 |
| Cell counts of MRSA (CFU/mL) | <10 | <10 | <10 | <10 | <10 |

Figure 20:
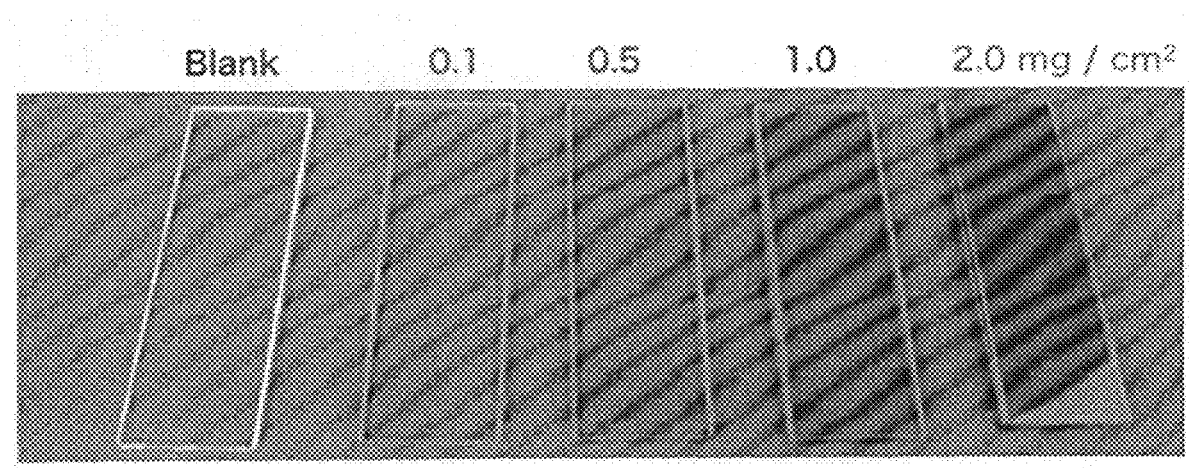
FIG. 20 is photographs taken of films formed on a glass substrate in various thicknesses.
Figure 21:
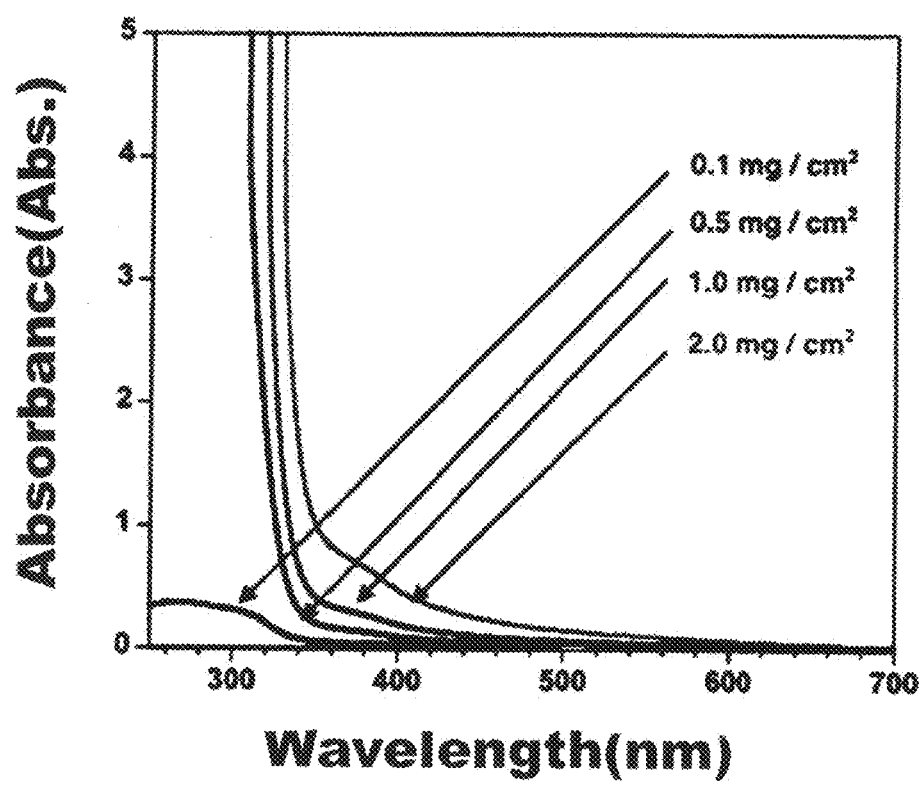
FIG. 21 is indicative of UV-visible absorption spectra of the films shown in FIG. 20.
Figure 22:
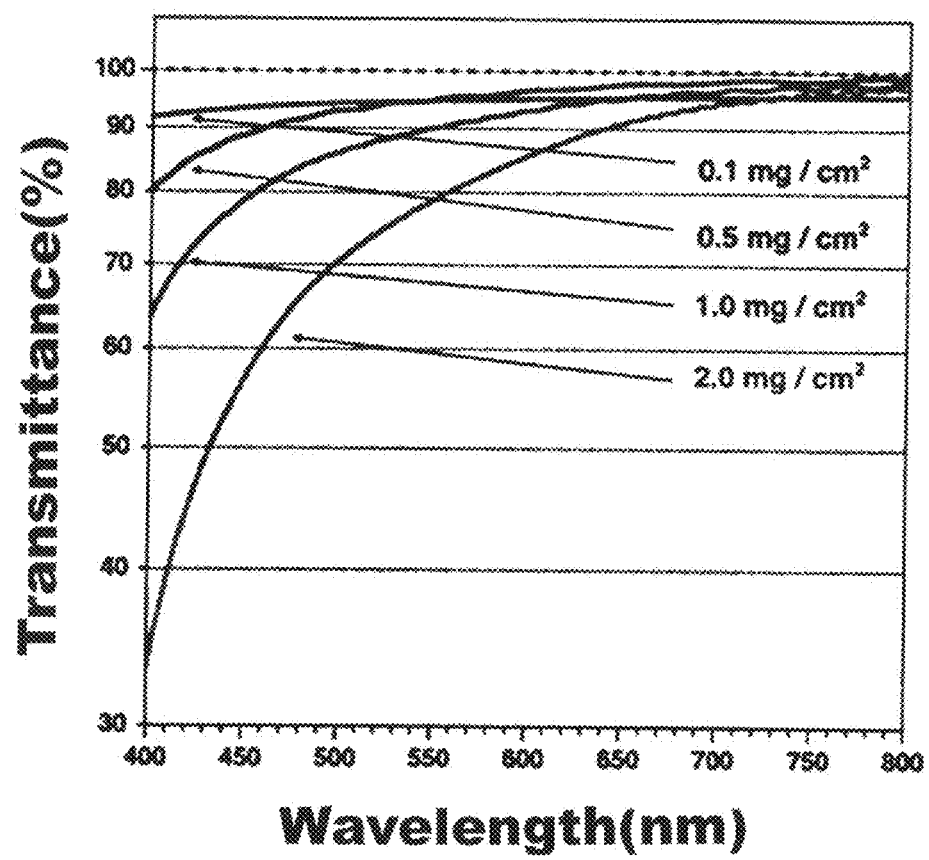
FIG. 22 is transmittance spectra of the films shown in FIG. 20.

As in the aforesaid method, a $TA(C_6)_{10}$ film was formed on a glass substrate in a coating amount of 0.1 mg/cm², 0.5 mg/cm², 1.0 mg/cm², and 2.0 mg/cm², respectively. Photographs taken of them are shown in FIG. 20. FIG. 21 is indicative of UV-visible spectra (Abs.) with the glass substrate as a control specimen, and FIG. 22 is indicative of visible transmission (%) spectra. The film having a coating amount of 0.1 mg/cm² shows a transmittance of greater than 90% over all visible light regions. As described above, the 0.1 mg/cm² film, because of having enough bactericidal activity as well, is expected to find use as a bactericidal film for display devices.

APPLICABILITY TO THE INDUSTRY

The film-forming composition of the invention, because of being formed on a metal, glass or like substrate for the purpose of rust prevention, sterilization and bactericidal activity, is expected to have a wide range of applications.

What is claimed is:

1. A method of forming anti-rust or anti-bacterial film, comprising:
    mixing a predetermined liquid and a tannic acid derivative in which hydrogen atoms in at least 10% of hydroxyl groups of tannic acid are substituted by a chain hydrocarbon group having 6 to 16 carbon atoms;
    applying a mixture of the predetermined liquid and the tannic acid derivative on a substrate; and
    removing the predetermined liquid, thereby forming the anti-rust or the anti-bacterial film consisting essentially of the tannic acid derivative in which molecules of the tannic acid derivative line up with the chain hydrocarbon groups arranged side by side that contributes to stabilization of the film on the substrate,
    wherein the predetermined liquid is water or an organic solvent compatible with water.

2. The method according to claim 1, wherein said chain hydrocarbon group of said tannic acid is an alkyl group.

3. The method according to claim 1, wherein 10% to 80% of hydroxyl groups of said tannic acid derivative is substituted by said chain hydrocarbon group.

4. The method according to claim 1, further comprising adding an inert gas to the mixture of the predetermined liquid and the tannic acid derivative, thereby forming a spray composition forming the anti-rust or the anti-bacterial film.

5. The method according to claim 1, wherein a number of the hydroxyl groups of the tannic acid is 25, and
    a number of the hydroxyl groups of the tannic acid substituted by the chain hydrocarbon group is 10.

6. The method according to claim 1, wherein the anti-bacterial film provides disinfection, pasteurization, or sterilization activity.

7. The method according to claim 1, wherein the anti-rust or anti-bacterial film is used for anti-rust or anti-bacterial purpose on a surface on which the anti-rust or anti-bacterial film is formed.

8. A method of forming anti-rust or anti-bacterial film, comprising:
    reacting a tannic acid and an alkyl iodide having 6 to 16 carbon atoms, thereby forming a tannic acid derivative;
    mixing a predetermined liquid and the tannic acid derivative in which hydrogen atoms in at least 10% of hydroxyl groups of the tannic acid are substituted by an alkyl group having 6 to 16 carbon atoms;
    applying a mixture of the predetermined liquid and the tannic acid derivative on a substrate; and
    removing the predetermined liquid, thereby forming the anti-rust or the anti-bacterial film consisting essentially of the tannic acid derivative in which molecules of the tannic acid derivative line up with the chain hydrocarbon groups arranged side by side that contributes to stabilization of the film on the substrate,
    wherein the predetermined liquid is water or an organic solvent compatible with water.

9. The method according to claim 8, wherein the alkyl iodide has 10 carbon atoms, and
    hydrogen atoms of 5 hydroxyl groups of the tannic acid are substituted by an alkyl group having 10 carbon atoms.

10. The method according to claim 8, wherein the alkyl iodide has 10 carbon atoms, and
    hydrogen atoms of 10 hydroxyl groups of the tannic acid are substituted by an alkyl group having 10 carbon atoms.

11. The method according to claim 8, wherein the alkyl iodide has 10 carbon atoms, and
    hydrogen atoms of 15 hydroxyl groups of tannic acid are substituted by an alkyl group having 10 carbon atoms.

12. The method according to claim 8, wherein the alkyl iodide has 10 carbon atoms, and
    hydrogen atoms of 20 hydroxyl groups of tannic acid are substituted by an alkyl group having 10 carbon atoms.

13. The method according to claim 8, wherein the alkyl iodide has 16 carbon atoms, and
    hydrogen atoms of 5 hydroxyl groups of tannic acid are substituted by an alkyl group having 16 carbon atoms.

14. The method according to claim 8, wherein the alkyl iodide has 16 carbon atoms, and
    hydrogen atoms of 10 hydroxyl groups of tannic acid are substituted by an alkyl group having 16 carbon atoms.

15. The method according to claim 8, wherein the alkyl iodide has 6 carbon atoms, and hydrogen atoms of 10 hydroxyl groups of tannic acid are substituted by an alkyl group having 6 carbon atoms.

\* \* \* \* \*